(12) United States Patent
Itadu et al.

(10) Patent No.: US 11,292,751 B2
(45) Date of Patent: Apr. 5, 2022

(54) METHOD FOR PRODUCING HONEYCOMB STRUCTURE

(71) Applicant: NGK INSULATORS, LTD., Nagoya (JP)

(72) Inventors: Ken Itadu, Nagoya (JP); Nobuhiro Fujie, Nagoya (JP); Yuji Watanabe, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 71 days.

(21) Appl. No.: 16/774,350

(22) Filed: Jan. 28, 2020

(65) Prior Publication Data

US 2020/0255347 A1  Aug. 13, 2020

(30) Foreign Application Priority Data

Feb. 8, 2019 (JP) .............................. JP2019-022104

(51) Int. Cl.
*C04B 40/00* (2006.01)
*B28B 11/24* (2006.01)
*B28B 11/14* (2006.01)
*F26B 3/06* (2006.01)
*C04B 38/00* (2006.01)

(52) U.S. Cl.
CPC .......... *C04B 40/0075* (2013.01); *B28B 11/14* (2013.01); *B28B 11/24* (2013.01); *C04B 38/0006* (2013.01); *F26B 3/06* (2013.01)

(58) Field of Classification Search
None
See application file for complete search history.

(56) References Cited

U.S. PATENT DOCUMENTS

| 5,165,970 | A | * | 11/1992 | Schmidt | ................... B01J 37/02 427/235 |
| 5,953,832 | A | * | 9/1999 | Rosynsky | ............... B28B 11/04 34/403 |
| 6,932,932 | B2 | | 8/2005 | Miura et al. | |
| 8,729,436 | B2 | * | 5/2014 | Adrian | .................. B28B 11/243 219/681 |
| 2010/0295218 | A1 | * | 11/2010 | Dotzel | ...................... F26B 5/06 264/489 |

FOREIGN PATENT DOCUMENTS

JP  2002-283330 A1  10/2002
JP  2013-121704 A1  6/2013

* cited by examiner

*Primary Examiner* — Erin Snelting
(74) *Attorney, Agent, or Firm* — Burr & Brown, PLLC

(57) ABSTRACT

A method for producing a honeycomb structure, the method including: a step of drying a pillar-shaped honeycomb formed body including partition walls that define a plurality of cells each forming a flow path penetrating from a first end face to a second end face; and after the step of drying, a step of cooling the honeycomb formed body by applying a suction force to the first end face of the honeycomb formed body to allow a coolant to flow in the honeycomb formed body from the second end face, pass through the cells, and flow out from the first end face.

10 Claims, 10 Drawing Sheets

METHOD FOR PRODUCING HONEYCOMB STRUCTURE

FIELD OF THE INVENTION

The present invention relates to a method for producing a honeycomb structure.

BACKGROUND OF THE INVENTION

An exhaust gas discharged from an internal combustion engine such as a diesel engine or a gasoline direct injection engine contains a large amount of particulates (particulate matters) mainly based on carbon that will cause environmental pollution. Therefore, in general, exhaust systems of the diesel engine or the like have been equipped with filters for collecting particulates, and exhaust systems of the gasoline direct injection engine are being increasingly equipped with filters for collecting particulates.

As such a filter, there is known a ceramic pillar-shaped honeycomb structure including: a plurality of first cells (108a) extending from a first end face (104) to a second end face (106), the first end face (104) being opened and the second end face (106) having plugged portions (103); and a plurality of second cells (108b) extending from the first end face (104) to the second end face (106), the first end face (104) having plugged portions (103) and the second end face (106) being opened, in which the first cells (108a) and the second cells (108b) are alternately arranged adjacent to each other across partition walls (112) (see FIG. 8).

The ceramic pillar-shaped honeycomb structure is produced by subjecting a green body to extrusion molding to provide a honeycomb formed body and then firing it. Since the honeycomb formed body contains a large amount of water, the firing step is typically carried out after the honeycomb formed body is extruded, dried and cooled.

Japanese Patent Application Publication No. 2002-283330 A (Patent Document 1) discloses that in order to dry a honeycomb formed body without causing defects such as cracks and wrinkles on an outer peripheral wall of the honeycomb formed body, the extruded clay-like honeycomb formed body is dried by exposing it to a high-humidity atmosphere with a humidity of 70% or more and also irradiating it with microwaves in a frequency range of from 1000 to 10000 MHz, and then applying hot air to the above honeycomb formed body so that it passes through the cells. Further, the document discloses that the honeycomb formed body after hot air drying is cooled to room temperature by applying cold air generated from a cold air generator so that it passes through the cells.

Japanese Patent Application Publication No. 2013-121704 A (Patent Document 2) discloses a method for producing a green honeycomb formed body, including a step of heating and drying a honeycomb-shaped green body having a plurality of through holes, and a step of cooling the green body by feeding a coolant from a blower to the through holes of the green body while conveying the green body after the step of drying. The document discloses that deformation and breakage during cooling and processing can be suppressed if the green body is forced to be cooled using the coolant after heating and drying the green body.

CITATION LIST

Patent Literatures

Patent Document 1: Japanese Patent Application Publication No. 2002-283330 A
Patent Document 2: Japanese Patent Application Publication No. 2013-121704 A

SUMMARY OF THE INVENTION

According to the honeycomb structure production techniques as described in Patent Document 1 and Patent Document 2, defects, deformation, or breakage of the honeycomb structure might be suppressed. However, these production techniques do not make sufficient consideration of how to improve productivity of the honeycomb structure, such as reduction of production costs and improvement of production speed.

The present invention was made in view of the above circumstances. An object of the present invention is to provide a method for producing a honeycomb structure, which can improve productivity.

As a result of intensive studies to solve the above problem, the present inventors have found the following points. In the prior arts, the cold air is fed from the blower into the cells of the honeycomb formed body. However, the opening area of each cell of the honeycomb formed body is small, so that even if the coolant is fed toward the cells, resistance is generated to prevent the cold air from efficiently entering the cells, and many of the coolants fed from the blower do not pass through the cells. Therefore, in the prior arts, it takes a long period of time to cool the honeycomb formed body. In particular, there is a problem that a temperature does not easily decrease near an outlet for the coolant from the honeycomb formed body. In order to rapidly cool the honeycomb formed body, it is necessary to feed a large amount of coolant toward the honeycomb formed body, which in turn causes a problem of increasing production costs.

Based on the above findings, the present inventors have studied a method of cooling the honeycomb formed body, and found that it is useful to solve the problem by sucking the coolant into the cells, rather than feeding it into the cells. The present invention has been completed based on the findings, and is illustrated below.

According to a first aspect of the present invention, a method for producing a honeycomb structure is provided, the method comprising:

a step of drying a pillar-shaped honeycomb formed body comprising partition walls that define a plurality of cells each forming a flow path penetrating from a first end face to a second end face; and after the step of drying, a step of cooling the honeycomb formed body by applying a suction force to the first end face of the honeycomb formed body to allow a coolant to flow in the honeycomb formed body from the second end face, pass through the cells, and flow out from the first end face.

According to a second aspect of the present invention, the method for producing the honeycomb structure according to the first aspect is provided, wherein in the step of cooling, a relationship: $0.9 \times F_1 \leq F_2 \leq 1.0 \times F_1$ is satisfied, in which $F_1$ is a flow rate of the coolant sucked by a suction device, and $F_2$ is a flow rate of the coolant that flows out from the first end face of the honeycomb formed body to which the suction force is applied by the suction device.

According to a third aspect of the present invention, the method for producing the honeycomb structure according to the first or second aspects is provided, wherein the step of cooling comprises:

inserting the honeycomb formed body into a hollow portion of a balloon chuck from the first end face side through an insertion port of the balloon chuck, the balloon chuck comprising: the insertion port; a communication port to the suction device; the hollow portion between the insertion port and the communication port; and a balloon disposed around the hollow portion;

injecting a fluid into the balloon to expand the balloon and fix the honeycomb formed body to the balloon chuck; and actuating the suction device to provide the suction force to the first end face of the honeycomb formed body fixed to the balloon chuck, via the communication port.

According to a fourth aspect of the present invention, the method for producing the honeycomb structure according to any one of the first to third aspects is provided, wherein the step of cooling further comprises feeding the coolant from a blower toward the second end face of the honeycomb formed body.

According to a fifth aspect of the present invention, the method for producing the honeycomb structure according to any one of the first to fourth aspects is provided, wherein the step of cooling comprises cooling the honeycomb formed body having 100° C. or more to 40° C. or less.

According to a sixth aspect of the present invention, the method for producing the honeycomb structure according to the fifth aspect is provided, wherein in the step of cooling, a cooling time from 100° C. to 40° C. is within 120 seconds.

According to a seventh aspect of the present invention, the method for producing the honeycomb structure according to any one of the first to sixth aspects is provided, wherein the step of cooling is carried out while disposing the honeycomb formed body such that a flow path direction of the cells is a vertical direction.

According to an eighth aspect of the present invention, the method for producing the honeycomb structure according to any one of the first to seventh aspects is provided, further comprising a step of plugging an opening of at least one cell on the first end face side and/or the second end face side of the honeycomb formed body, after the step of cooling.

According to a ninth aspect of the present invention, the method for producing the honeycomb structure according to any one of the first to eighth aspects is provided, further comprising a step of cutting the honeycomb formed body in a direction orthogonal to a flow path direction of the cells, after the step of cooling.

According to a tenth aspect of the present invention, the method for producing the honeycomb structure according to any one of the first to seventh aspects is provided, wherein the method comprises carrying out, after the step of cooling, a step of cutting the honeycomb formed body in a direction orthogonal to a flow path direction of the cells, and a step of plugging an opening of at least one cell on the first end face side and/or the second end face side of the honeycomb formed body, in this order.

According to one embodiment of a method for producing a honeycomb structure according to the present invention, a utilization efficiency of the coolant can be increased during the cooling of the honeycomb formed body, so that an amount of the coolant used can be decreased and/or the honeycomb formed body can be cooled for a short period of time. Therefore, according to the present embodiment, productivity of the honeycomb structure can be improved.

BRIEF DESCRIPTION OF THE DRAWINGS

FIG. 3-1 is a schematic view showing an arrangement example of a batch type cooling facility capable of simultaneously cooling a plurality of honeycomb formed bodies.

FIG. 3-2 is a schematic view showing another arrangement example of a batch type cooling facility capable of simultaneously cooling a plurality of honeycomb formed bodies.

FIG. 3-3 is a schematic view showing still another arrangement example of a batch type cooling facility capable of simultaneously cooling a plurality of honeycomb formed bodies.

DETAILED DESCRIPTION OF THE INVENTION

Embodiments of the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

Figure 5:
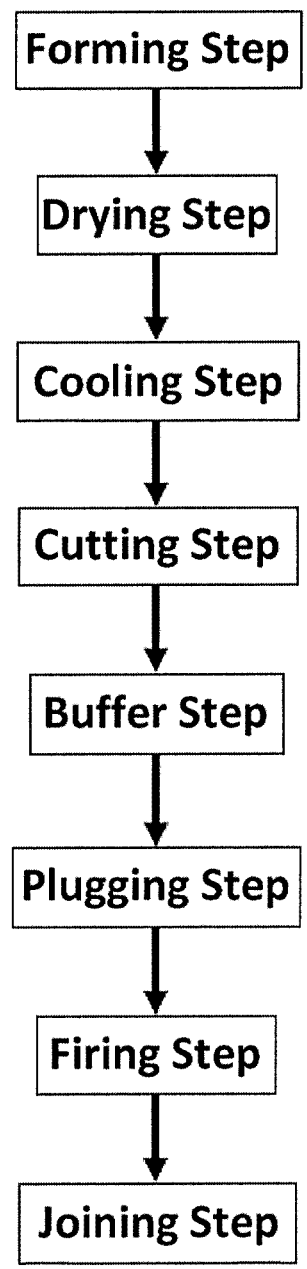
FIG. 5 is an example of a flowchart of a method for producing a honeycomb structure according to the present invention.

FIG. 5 shows an example of a flowchart of a method for producing a honeycomb structure according to the present invention described below.
(1. Structure of Honeycomb Formed Body)

Figure 1:
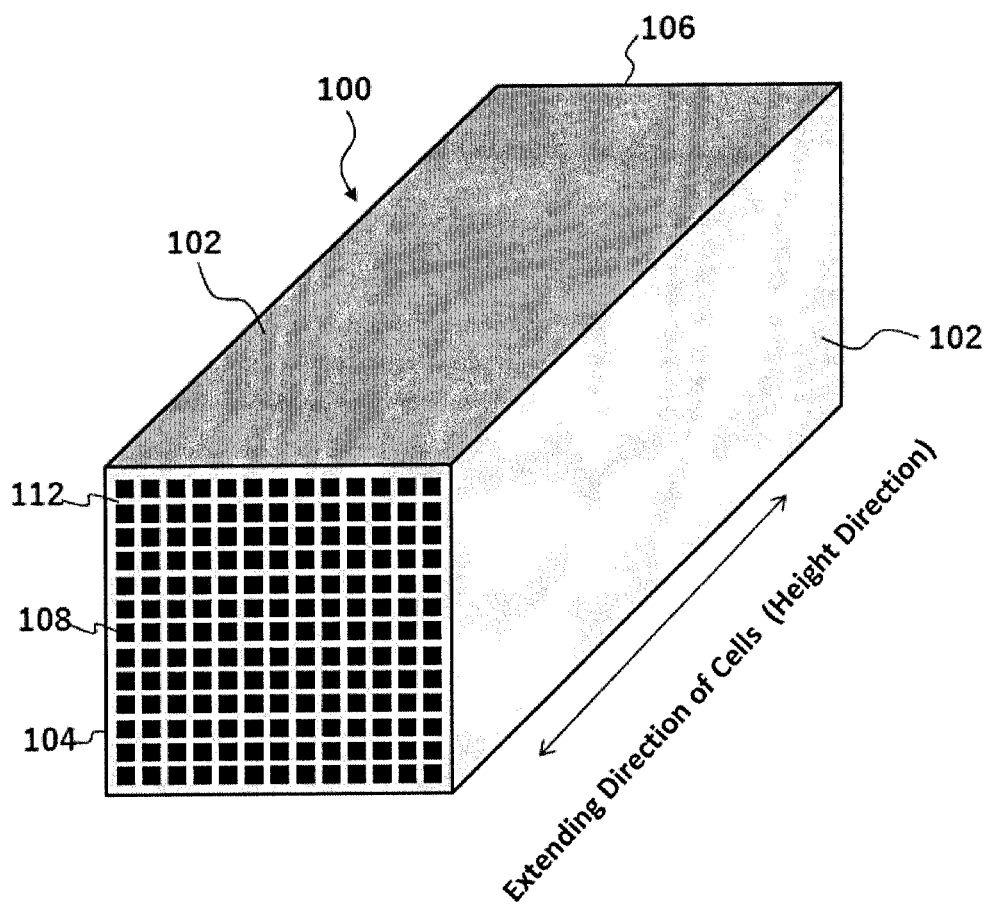
FIG. 1 is a perspective view schematically showing an example of a honeycomb formed body to be cooled.

FIG. 1 illustrates a perspective view schematically showing an example of a honeycomb formed body to be cooled. The illustrated honeycomb formed body (100) includes: a side face (102); and a plurality of cells (108) which are disposed inside the side face (102) and which form flow paths penetrating from a first end face (104) to a second end face (106). The cells (108) are defined by porous partition walls (112).

An outer shape of the honeycomb formed body is not particularly limited as long as it has a pillar shape. For example, it may be a pillar shape with end faces being polygonal or circular. Examples of the polygon include a quadrangle (rectangle, square, etc.) and a hexagon. Examples of the circle include a perfect circle, an ellipse, and an oval. In a typical embodiment, the outer shape of the honeycomb formed body may be a cylindrical shape or a quadrangular pillar shape. For a size of the honeycomb formed body, an area of each of the end faces is preferably from 600 to 20000 mm$^2$ and more preferably from 1000 to 3000 mm$^2$, in terms of improvement of thermal shock resistance. Furthermore, a length (height) of each cell of the honeycomb formed body to be cooled in a flow path direction can be, for example, from 100 to 500 mm, and typically from 120 to 400 mm.

A shape of the cell in a cross section orthogonal to a cell extending direction (a height direction) is not particularly limited. It is preferably a quadrangle, a hexagon, an octagon, or a combination thereof. Among these, the square and the hexagon are preferable. Such a shape of the cell decreases pressure loss and provides improved purification performance when a fired product of the honeycomb formed body is used as a filter.

(2. Forming Step)

The honeycomb formed body can be formed by the following procedure, for example. A raw material composition containing a ceramic raw material, a dispersion medium (typically water), a pore former and a binder is kneaded to form a green body, and then subjecting the green body to extrusion molding to produce a honeycomb formed body. The raw material composition may optionally contain additives such as a dispersing agent as needed. The extrusion molding can be carried out using a die having a desired overall shape, cell shape, partition wall thickness, cell density and the like.

The ceramic raw material includes, but not limited to, powder of cordierite, mullite, zircon, aluminum titanate, silicon carbide, silicon nitride, zirconia, spinel, indialite, saphirin, corundum, titania, and the like, and raw material powder for obtaining these ceramics. The raw material powder includes, but not limited to, silica, talc, alumina, kaolin, serpentine, pyroferrite, brucite, boehmite, mullite, magnesite, and the like. The ceramic raw material may be used alone or in combination of two or more.

The honeycomb formed body after extrusion molding is subjected to a step of drying. The drying can be carried out, for example, by applying hot air at about 120 to 160° C. to the formed body. The step of drying may be a combination of high-frequency drying such as microwaves and the hot air drying.

(3. Cooling Step)

After the step of drying, a step of cooling the honeycomb formed body is carried out. A temperature of the honeycomb formed body at the start of the step of cooling is not limited, but it is generally 100° C. or more, and typically from 100 to 150° C. In one embodiment, the step of cooling includes cooling the honeycomb formed body by applying a suction force to the first end face of the honeycomb formed body, whereby the coolant flows in the honeycomb formed body from the second end face, passes through the cells, and flows out from the first end face. From the viewpoint of reducing the installation space for a cooling facility, the step of cooling is preferably carried out while disposing the honeycomb formed body such that a flow path direction of the cells is a vertical direction. The coolant includes, but not limited to, air, nitrogen, noble gases (argon or the like). From the viewpoint of ease of handling and costs, the air is preferable as the coolant. From the viewpoint of increasing the cooling rate, the temperature of the coolant is preferably 35° C. or less, and more preferably 30° C. or less, and even more preferably 25° C. or less. Typically, the temperature of the coolant can be from 20 to 25° C.

Non-limiting examples of a method of applying the suction force to the first end face of the honeycomb formed body includes a method of communicating the first end face with the suction device via a pipe. As the suction device, for example, an exhauster such as a fan or blower can be used. When the suction device is actuated, the suction force applied to the first end face propagates to the second end face, and the coolant is sucked into the second end face. The coolant flowing in from the second end face passes through the cells, and substantially the total amount of the coolant flows out from the first end face. The honeycomb formed body is cooled while the coolant passes through the cells. The coolant flowing out from the first end face is fed to the suction device through the pipe. It is preferable that a connection part between the first end face and the pipe have high airtightness so that an ambient gas is not accompanied. The increased airtightness of the connection part can reduce a difference between a flow rate of the coolant sucked by the suction device and a flow rate of the coolant flowing out from the first end face of the honeycomb formed body, so that the suction device can be efficiently operated. According to a preferred embodiment, the relationship: $0.9 \times F_1 \leq F_2 \leq 1.0 \times F_1$ is satisfied, and more preferably, $0.95 \times F_1 \leq F_2 \leq 1.0 \times F_1$ is satisfied in the step of cooling, in which $F_1$ is a flow rate of the coolant sucked by the suction device, and $F_2$ is a flow rate of the coolant that flows out from the first end face of the honeycomb formed body to which the suction force is applied by the suction device. In the equation, when a plurality of honeycomb formed bodies are to be cooled, $F_1$ represents the total flow rate flowing out from the first end face of the honeycomb formed bodies. Also, in the equation, when a plurality of suction devices are used, $F_2$ represents the total flow rate of the coolant sucked by the suction devices.

Figure 2A:
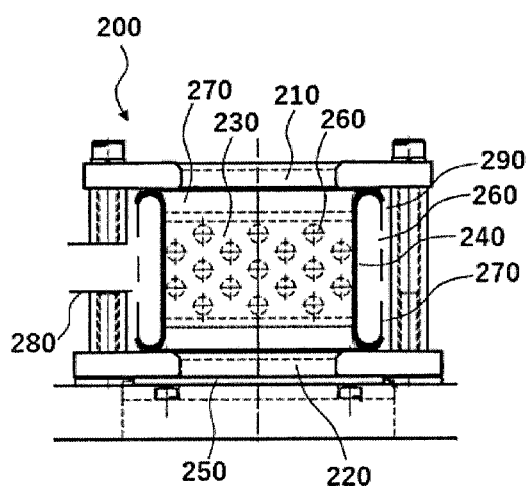
FIGS. 2(A) and 2(B) are schematic views showing a structural example of a balloon chuck.

A method for improving the airtightness of the connection part between the first end face of the honeycomb formed body and the pipe includes a method for covering the connection part in an airtight manner. For example, a method using a balloon chuck is preferable. The use of the balloon chuck can increase the airtightness of the connection part, and can allow the pressing force from the balloon to be easily dispersed over the entire contact surface of the honeycomb formed body and prevent a large local pressure from being applied, so that the honeycomb formed body will not easily break during the fixing. FIG. 2(A) shows a structural example of a balloon chuck (200). The balloon chuck (200) includes: an insertion port (210); a communication port (220) to the suction device; a hollow portion (230) between the insertion port (210) and the communication port (220); and a balloon (240) disposing around the hollow portion (230). The balloon (240) is preferably disposed so as to surround the hollow portion (230), and a plurality of balloons can be disposed as needed. The balloon (240) is generally made of a rubber, and preferably made of a heat-resistant rubber such as silicone rubbers, fluorine rubbers, and acrylic rubbers. The balloon chuck (200) according to the illustrated embodiment includes: a side wall (270) provided with a plurality of through holes (260) on the outer peripheral side of the balloon (240); and a flow path (290) of a fluid (typically a gas such as air) that can flow in and out through a fluid port (280), formed on the outer peripheral side of the side wall.

Figure 2B:
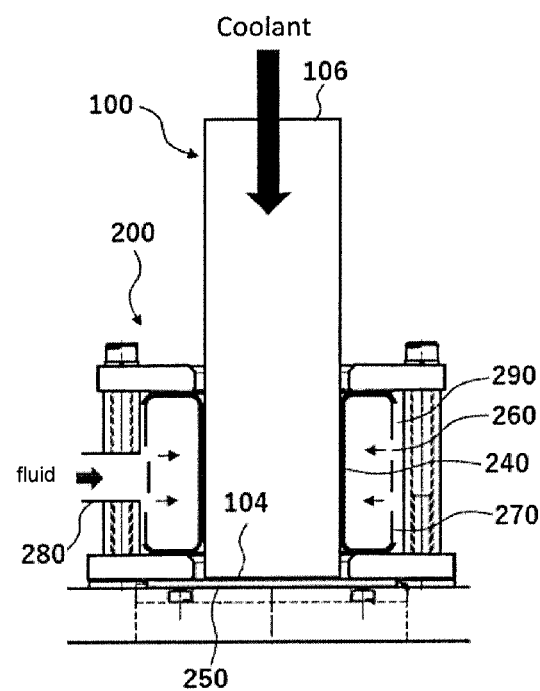

A method of fixing the honeycomb formed body to the balloon chuck (200) will be described. The honeycomb formed body (100) is inserted into the hollow portion (230) of the balloon chuck (200) from the first end face (104) side through the insertion port (210). The communication port (220) can be provided with an air permeable bottom plate (250). The bottom plate (250) can prevent the honeycomb formed body from being inserted into an excessively deep position. Further, by inserting the honeycomb formed body until the first end face (104) is brought into contact with the bottom plate (250), the bottom plate (250) can play a role of determining the insertion depth of the honeycomb formed body. The bottom plate (250) is air permeable so that the coolant can pass therethrough. The bottom plate may have a plurality of through holes, such as, for example, a mesh. Subsequently, once a fluid (typically a gas such as air) is fed from the fluid port (280) to the flow path (290), the fluid is injected into the balloon (240) via the through holes (260). Accordingly, when the balloon (240) expands toward the honeycomb formed body (100) inserted into the hollow portion (230), the honeycomb formed body (100) is fixed to the balloon chuck (200) by a pressing force from the balloon (240) (see FIG. 2(B)).

The suction device is then actuated to apply a suction force via the communication port (220) to the first end face (104) of the honeycomb formed body (100) fixed to the balloon chuck (200), whereby the coolant flows in the honeycomb formed body (100) from the second end face (106), passes through the cells, and flows out from the first end face (104).

In the step of cooling, the coolant may be additionally fed from the blower toward the second end face of the honeycomb formed body. When the temperature of the coolant flowing in the honeycomb formed body from the second end face is higher due to the actuating of the suction device, a cooling rate may decrease. For example, in summer, the temperature in the factory tends to rise, and when air in the factory is used as the coolant, the cooling rate tends to decrease. Therefore, in such a case, the cooling rate can be increased by feeding the coolant from the blower toward the second end face of the honeycomb formed body. From the viewpoint of increasing the cooling rate, it is preferable that the temperature of the coolant fed from the blower is lower. More particularly, the temperature of the coolant fed from the blower is lower than the temperature of the coolant (which is typically the same as the air temperature in the factory) flowing in the second end face of the honeycomb formed body when only the suction device is actuated, by preferably 5° C. or more, and more preferably by 10° C. or more, and even more preferably by 15° C. or more. Further, the temperature of the coolant fed from the blower can be preferably 35° C. or less, and more preferably 30° C. or less, and even more preferably 25° C. or less, for example, from 20° C. to 25° C.

When a plugging step as described later is carried out when the honeycomb formed body has a temperature more than 40° C., a defect (sink defect) which causes holes in the plugged portions tends to occur. By cooling the honeycomb formed body to 40° C. or less in the step of cooling, the plugging step can be carried out without waiting a certain period of time after the cooling. Therefore, in the step of cooling, the honeycomb formed body having a temperature of 100° C. or more is preferably cooled to 40° C. or less, and more preferably 35° C. or less, and still more preferably 30° C. or less. However, it is not necessary to cool excessively from the viewpoint of energy saving. It is thus preferably cooled to 10° C. or more, and more preferably 15° C. or more, and even more preferably 20° C. or more. When referring to the temperature of the honeycomb formed body, it means the temperature of the hottest portion in the honeycomb formed body, unless otherwise specified.

During cooling, a time required for the honeycomb formed body to be cooled from 100° C. to 40° C. can be preferably within 120 seconds, and more preferably within 100 seconds, and still more preferably within 80 seconds, for example, within 60 to 80 seconds. The cooling rate can be controlled by adjusting the temperature and flow rate of the coolant.

Figures 1, 3:
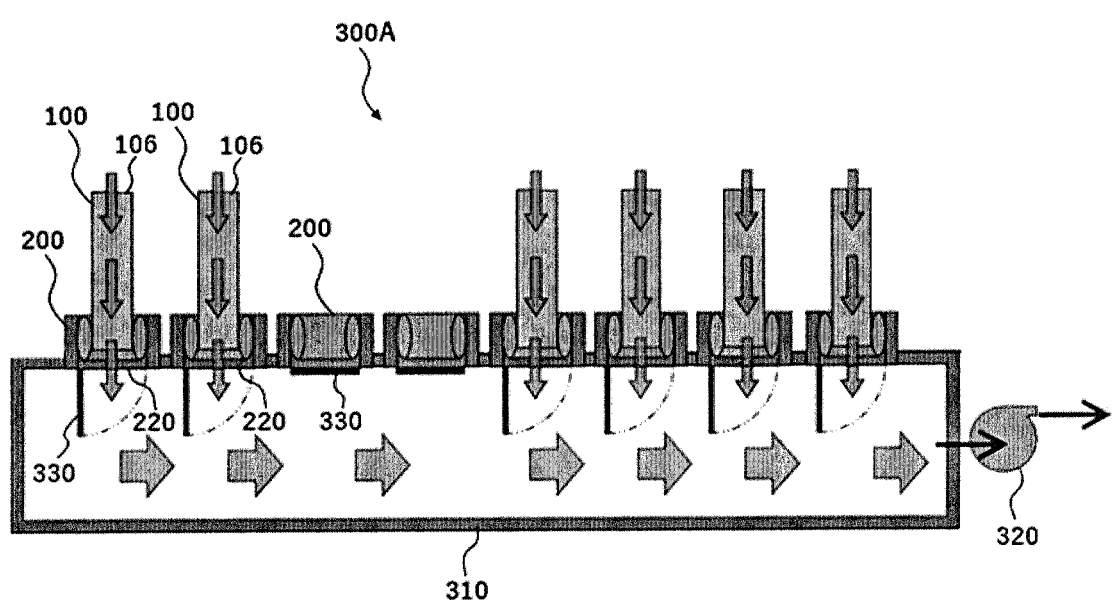

From an industrial viewpoint, it is desirable that a plurality of honeycomb formed bodies can be simultaneously cooled. FIG. 3-1 illustrates an arrangement example of a batch type cooling facility (300A) capable of simultaneously cooling a plurality of honeycomb formed bodies (100). The cooling facility (300A) includes a plurality of balloon chucks (200); a common exhaust duct (310) in communication with each communication port (220) of the balloon chucks (200); and an exhauster (320) in communication with the exhaust duct (310). The number of balloon chucks (200) is not particularly limited. However, since an increased number of honeycomb formed bodies that can be cooled at the same time can increase the productivity, the number of balloon chucks (200) is preferably 10 or more, and more preferably 20 or more.

In order to save installation space, each balloon chuck (200) is preferably arranged such that a flow path direction of the cells when the honeycomb formed body (100) is inserted is vertical. Each balloon chuck can also be provided with an on-off valve (330) for controlling the flow of the coolant. For example, by closing the on-off valve (330) of the balloon chuck (200) that is not in use, it is possible to prevent the coolant from flowing unnecessarily.

Figures 2, 3:
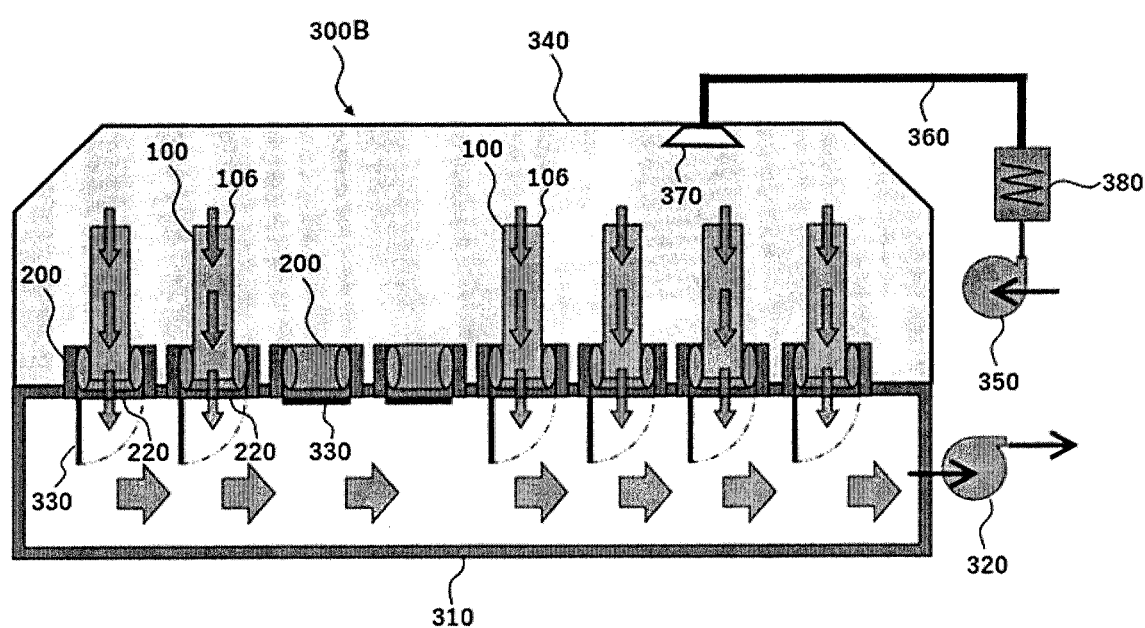
Figure 3:
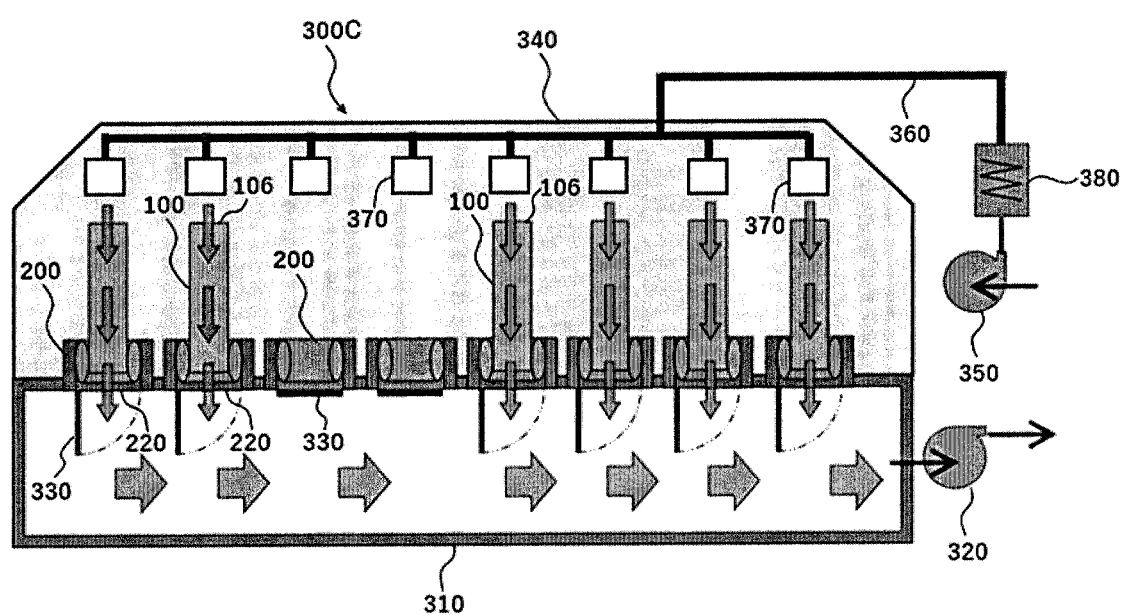

The balloon chucks (200) may be disposed in a housing (340) as in a cooling facility (300B) shown in FIG. 3-2. In this case, the coolant such as air can be fed into the housing (340) from a blower (350). This can allow the step of cooling to be carried out in the housing (340) that is isolated from outside air, resulting in easy temperature control of the coolant in the step of cooling. It can be configured such that the coolant fed from the blower (350) flow into the housing from a coolant blowing port (370) through a blower duct (360). The coolant flowing through the blower duct (360) may be cooled by disposing a cooler (380) in the middle of the blower duct (360). Non-limiting examples of a cooling system thereof include a heat pump type, a water-cooling type, an air-cooling type, or combinations of two or more of these. It is also possible to circulate the coolant by connecting an outlet of the exhauster (320) to an inlet of the blower (350) or by commonalizing the exhauster (320) and the blower (350).

One or more coolant blowing ports (370) may be provided in the housing (340). Further, an individual coolant blowing port (370) may be provided so as to face the second end face (106) of each of the honeycomb formed bodies (100) fixed to the balloon chucks (200), as in a cooling facility (300C) shown in FIG. 3-3. In this case, a distance between the coolant blowing port (370) and the second end face (106) of each honeycomb formed body (100) during feeding of the coolant can be 20 cm or less, and preferably 14 cm or less. This can allow the coolant discharged from the coolant blowing port (370) to flow toward the second end face of each honeycomb formed body, so that the temperature of the coolant can be prevented from rising until the coolant reaches the cells of each honeycomb formed body.

Each coolant blowing port (370) may be configured such that the distance from the second end face (106) of the honeycomb formed body (100) is changeable. Accordingly, when the honeycomb formed body is inserted into or removed from the balloon chuck (200), the coolant blowing port (370) can be separated from the second end face (106) so as not to hinder this operation. When the coolant is fed, the distance between the coolant blowing port (370) and the second end face (106) of the honeycomb formed body (100) can be close.

Figure 4:
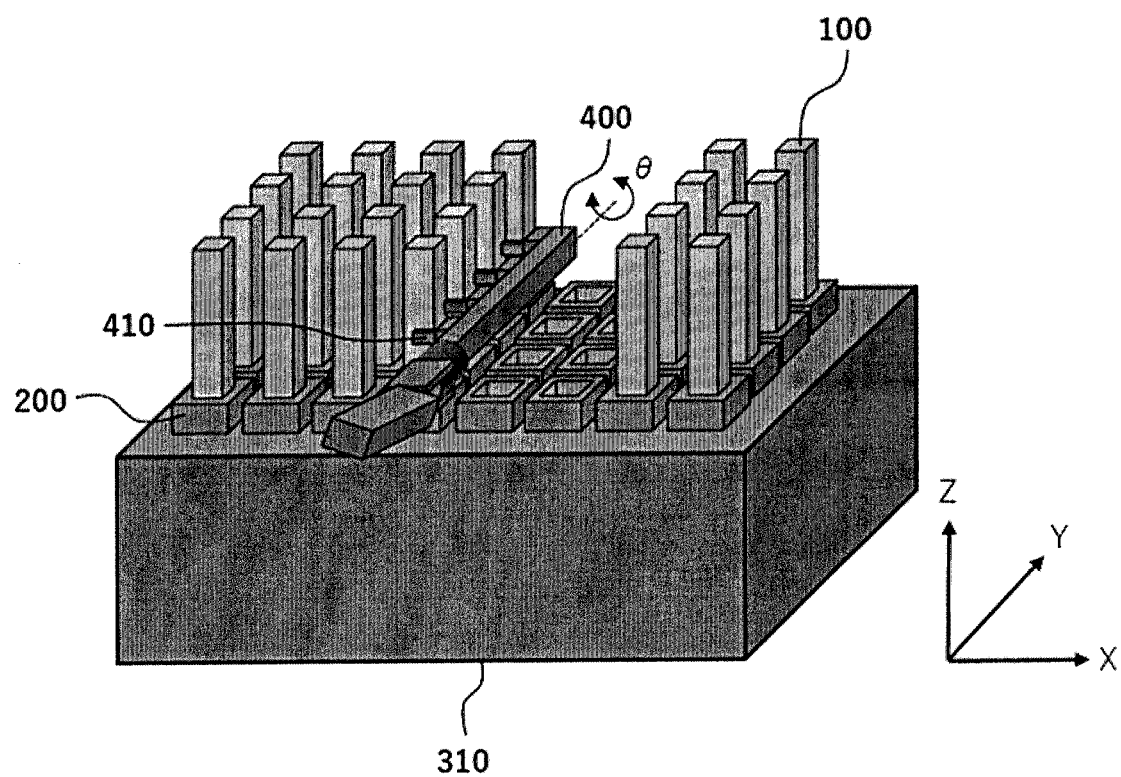
FIG. 4 is a schematic view showing a state where a robot arm inserts honeycomb formed bodies into balloon chucks.

A method for inserting the honeycomb formed body (100) into the balloon chuck (200) may be carried out by manual operation, but it is preferable to use a robot arm (400) as shown in FIG. 4. The robot arm (400) can move in the X-axis direction, the Y-axis direction, and the Z-axis direction, and can rotate about the axis direction of the arm as a rotation axis. The robot arm (400) has a gripping claw (410), which can grip and release the honeycomb formed body (100) by opening and closing the gripping claw (410). The robot arm (400) can be controlled by a controller. The robot arm (400) can be configured to move to a position where the honeycomb formed body (100) is placed, grip the honeycomb formed body (100), insert the honeycomb formed body (100) into the balloon chuck (200), and then release the honeycomb formed body (100). The robot arm (400) can also be configured to grip the cooled honeycomb formed body (100), pull out the honeycomb formed body (100) from the balloon chuck (200), move the honeycomb formed body (100) to a predetermined position, and then release the honeycomb formed body (100). The robot arm (400) may have a plurality of gripping claws. This can allow a plurality of honeycomb formed bodies to be gripped, moved and released simultaneously.

(4. Cutting Step)

After the step of cooling, a step of cutting the honeycomb formed body in a direction orthogonal to the flow path direction of the cells may be carried out. The step of cooling may be carried out using a long honeycomb formed body, and the honeycomb formed body may be then cut into a predetermined length, whereby the number of the honeycomb formed bodies cooled can be decreased, so that a production efficiency can be increased. For example, the cutting can be carried out using a rotating grindstone.

(5. Plugging Step)

After the step of cooling, a step of plugging an opening of at least one cell on the first end face side and/or the second end face side of the honeycomb formed body may be carried out. In a typical plugging step, the openings of the cells on both end faces of the honeycomb formed body are alternately plugged. This can allow the plugged portions to be formed in a checkered pattern on each end face. The plugging step is to form plugged portions by plugging the openings of the cells. For example, in the plugging step, the plugged portions are formed by plugging the openings of a part of the cells with the same material as that used for producing the honeycomb formed body. The step of plugging can be carried out in accordance with a known method for producing a honeycomb structure.

When carrying out the cutting step, the step of plugging may be carried out after the step of cutting. Therefore, in one embodiment, after the step of cooling, at least the step of cutting the honeycomb formed body in a direction orthogonal to the flow path direction of the cells and the step of plugging the opening of at least one cell on the first end face side and/or the second end face side of the honeycomb formed body are carried out in this order.

After the step of cooling and the optional step of cutting and before proceeding to the step of plugging, a step of buffering for adjusting a production rate may be carried out. By carrying out the step of buffering, it is possible to adjust a period of time until the step of plugging begins. In the step of buffering, the honeycomb formed bodies after the step of cooling and the optional step of cutting are aligned, and a required number of the honeycomb formed bodies are sequentially conveyed to the step of plugging. The conveyance of the honeycomb formed bodies in the step of buffering can be controlled by, for example, a controller, and a robot arm that can grip, move, and release the honeycomb formed bodies can be employed.

In one embodiment, the step of plugging includes:
attaching a film to the first end face and/or the second end face of the honeycomb formed body;
forming a plurality of holes in the film and then pressing a plugging slurry into the holes;
drying and solidifying the slurry;
removing the solidified slurry attached to the film; and
releasing the film from the honeycomb formed body.

After attaching the film, a plurality of holes are formed in the film part covering the cells where the plugged portions are to be provided, and the end face portion to which the film has been attached is then immersed in the plugging slurry to press the plugging slurry into the end of the cells from the holes. A method for forming the holes in the film is not particularly limited, but it can be carried out by laser processing using image processing, for example. In one embodiment, a honeycomb formed body in which the cells on both end faces are alternately sealed with the plugging slurry is produced.

Examples of the plugging slurry that can be used include those prepared by mixing ceramic powder, a dispersion medium (for example, water) and optional additives such as a binder, a peptizer and a foaming resin that can be mixed as needed. The ceramic is preferably a ceramic containing at least one selected from the group consisting of cordierite, mullite, zircon, aluminum titanate, silicon carbide, silicon nitride, zirconia, spinel, indialite, sapphirine, corundum, and titania, and is more preferably the same material as that of the honeycomb structure. Examples of the binder include polyvinyl alcohol and methyl cellulose.

In many cases, the solidified plugging slurry is excessively attached to the end faces and side face of the film-attached honeycomb formed body having the plugged portions. It is preferable to remove an excessive portion of the solidified plugging slurry in order to release the film easily. The method of removing the excessive portion of the solidified plugging slurry is not particularly limited. For example, it can be removed by brushing. The brushing may be manually carried out, but it is preferable that it is automatically carried out using a brushing apparatus from an industrial viewpoint.

After removing the excessive portion of the solidified plugging slurry, the film is released from the honeycomb formed body. The method of releasing the film is not particularly limited, and the film may be released by manually pulling it. However, it is preferable that the film should be automatically released using a film releasing device from an industrial viewpoint.

(6. Firing Step)

After carrying out the step of cooling of the honeycomb formed body and then optionally carrying out the step of cutting and/or the step of plugging as needed, a step of firing the honeycomb formed body can be carried out. For the firing conditions, any known conditions for the honeycomb structure may be adopted, and are not particularly limited.

Prior to the step of firing, a step of degreasing may be carried out. A combustion temperature of the binder is about 200° C., and a combustion temperature of the pore former is from about 300 to 1000° C. Therefore, the step of degreasing may be carried out by heating the honeycomb formed body to a range of from about 200 to 1000° C. A heating time is not particularly limited, but it is typically from about 10 to 100 hours. The honeycomb formed body after the step of degreasing is referred to as a calcined body. The step of firing can be carried out by heating the calcined body to, for example, 1350 to 1600° C. and maintaining it for 3 to 10 hours, depending on the material composition of the honeycomb formed body.

(7. Joining Step)

Each of the honeycomb fired products may be used as a honeycomb segment, and the side faces of the honeycomb segments may be joined together by a joining material for integration to form a segment joined body. The segment joined body can be produced as follows, for example. The joining material is applied to the joining surfaces (side faces)

in a state where joining material adhesion preventing films are attached to both end faces of each honeycomb segment.

These honeycomb segments are then arranged so as to be adjacent to each other such that the side faces of the honeycomb segments face each other, and the adjacent honeycomb segments are pressure-bonded to each other and then dried by heating. The segment joined body in which the side faces of adjacent honeycomb segments are joined together by the joining material is thus produced. For the segment joined body, the outer peripheral portion may be ground into a desired shape (for example, a cylindrical shape), coated with a coating material on the outer peripheral surface, and then dried by heating to form an outer peripheral wall.

Though the material for the joining material adhesion preventing film are not particularly limited, synthetic resins such as polypropylene (PP), polyethylene terephthalate (PET), polyimide or Teflon® can be suitably used. The film preferably includes an adhesive layer, and the adhesive layer is preferably made of an acrylic resin, a rubber-based material (for example, rubber mainly based on a natural rubber or a synthetic rubber), or a silicon-based resin.

As the joining material adhesion preventing film, for example, an adhesive film having a thickness of from 20 to 50 μm can be suitably used.

Examples of the joining material that can be used include those prepared by mixing ceramic powder, a dispersion medium (for example, water) and optional additives such as a binder, a peptizer and a foaming resin that can be mixed as needed. The ceramic is preferably a ceramic containing at least one selected from the group consisting of cordierite, mullite, zircon, aluminum titanate, silicon carbide, silicon nitride, zirconia, spinel, indialite, sapphirine, corundum, and titania, and is more preferably the same material as that of the honeycomb structure. Examples of the binder include polyvinyl alcohol and methyl cellulose.

The honeycomb structure according to the present invention can be used as a heat exchanger, a catalyst support, and the like, in addition to the filter.

EXAMPLES

While Examples will be illustrated below for better understanding of the present invention and its advantages, the present invention is not limited to the Examples.

Example 1

A raw material composition containing silicon carbide powder, water, a pore former and a binder was kneaded to prepare a green body. The green body was extruded to obtain a honeycomb formed body having a cuboid shape with a length of 42 mm×a width of 42 mm×a height of 415 mm, in which each cell extended in the height direction and a cell density was 465 kcells/m$^2$ (300 cpsi). The honeycomb formed body was placed in a dryer and dried with hot air at 120° C. for 1 hour.

Immediately after the honeycomb formed body was removed from the dryer, the honeycomb formed body was inserted into the balloon chuck having the structure as shown in FIG. 2 such that the flow path direction of the cells was the vertical direction, until the first end face of the honeycomb formed body was brought into contact with a mesh-shaped bottom plate. The honeycomb formed body was then fixed to the balloon chuck by expanding the balloon. The communication port of the balloon chuck was communicated with the exhauster via the pipe. The exhauster was actuated to provide a suction force to the first end face of the honeycomb formed body fixed to the balloon chuck via the communication port, and to suck the ambient air (about 25° C.) at 0.6 m$^3$/min from the second end face of the honeycomb formed body, thereby cooling the honeycomb formed body. At this time, a flow rate of the air sucked from the second end face of the honeycomb formed body was substantially the same as a flow rate of the air sucked by the exhauster.

Figure 6:
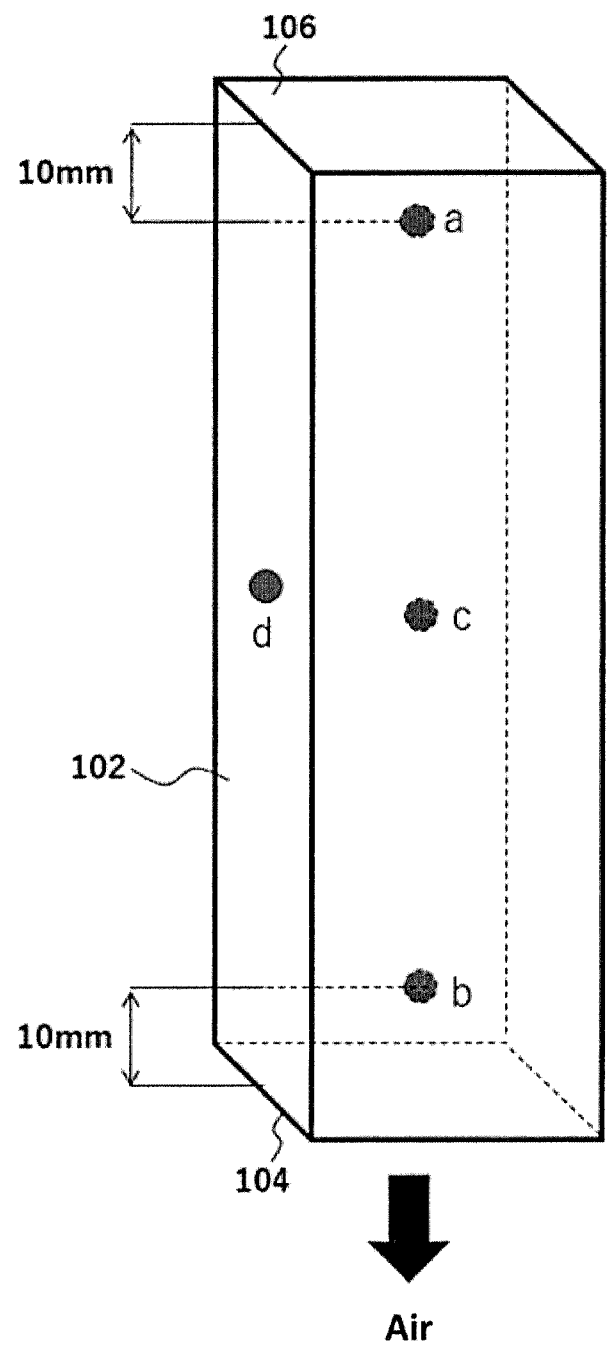
FIG. 6 is a schematic view showing disposing positions of thermocouples when a temperature change of a honeycomb formed body is monitored in Example.

During a cooling test of the honeycomb formed body, a temperature change of the honeycomb formed body was monitored using thermocouples at measurement points of a to d as shown in FIG. 6. More particularly, the temperature measurement points were as follows:

near the center of the honeycomb formed body at a position of 10 mm from the second end face toward the first end face of the honeycomb formed body in the flow path direction of the cells (a: a central portion of an air inlet);

near the center of the honeycomb formed body at a position of 10 mm from the first end face toward the second end face of the honeycomb formed body in the flow path direction of the cells (b: a central portion of an air outlet);

near the center of the honeycomb formed body in the middle of the length of the honeycomb formed body in the flow path direction of the cells (c: a center of the interior of the honeycomb); and the side face of the honeycomb formed body in the middle of the length of the honeycomb formed body in the flow path direction of the cells (d: a honeycomb side face).

Figure 7:
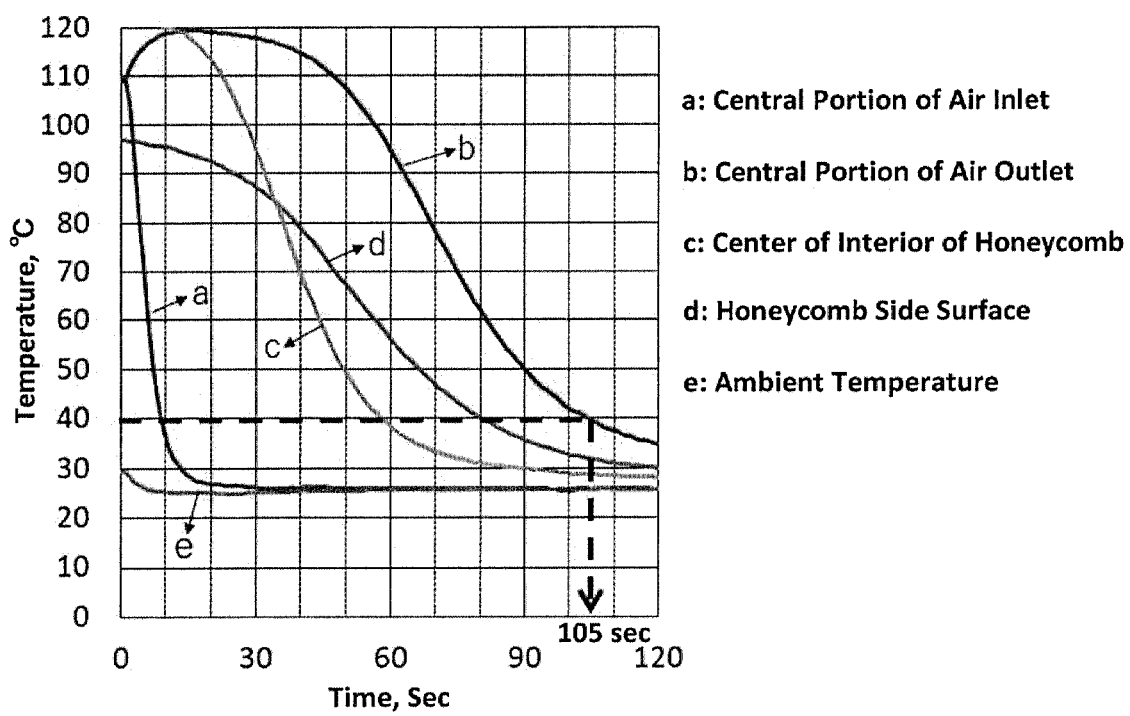
FIG. 7 is a graph showing a temperature change during cooling of a honeycomb formed body in Example 1.
Figure 8:
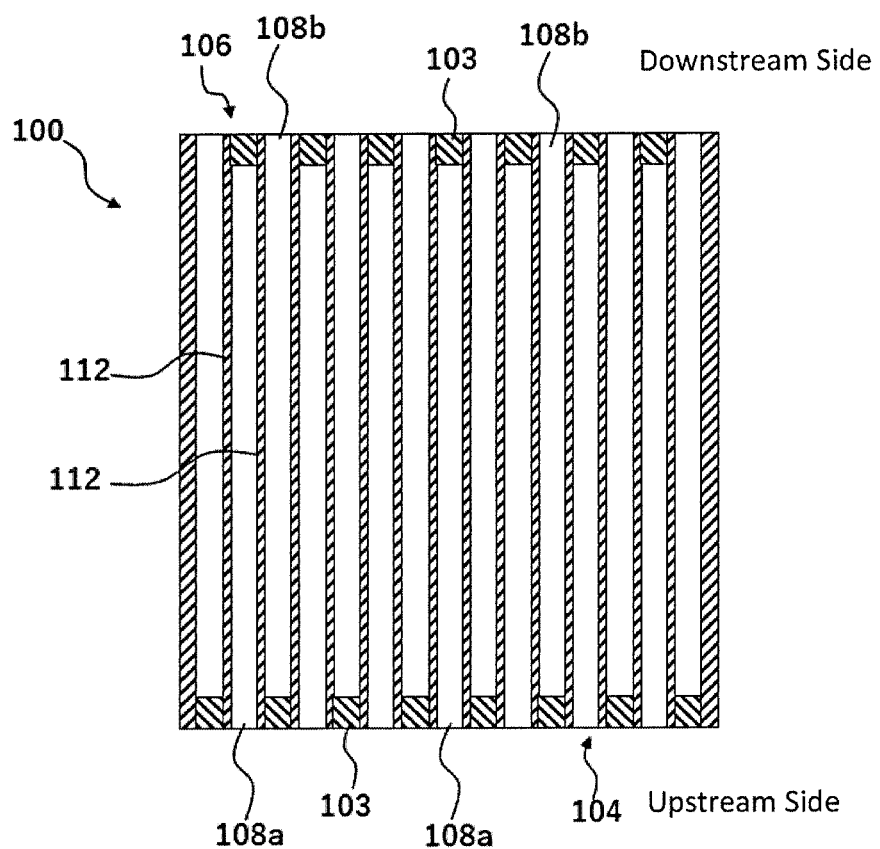
FIG. 8 is a schematic cross-sectional view illustrating a structure of a pillar-shaped honeycomb structure having plugged portions.

The results are shown in FIG. 7. As can be seen from the graph of FIG. 7, it was possible to decrease the temperature at all the measurement points to 40° C. or less, which can prevent sink defects in the step of plugging, in a short period of time of about 105 seconds. Further, even at the central portion of the air outlet which was the most difficult to cool, it only required about 50 seconds to cool the honeycomb body from 100° C. to 40° C.

Example 2

A raw material composition containing silicon carbide powder, water, a pore former and a binder was kneaded to prepare a green body. The green body was extruded to obtain a honeycomb formed body having a cuboid shape with a length of 42 mm×a width of 42 mm×a height of 415 mm, in which each cell extended in the height direction and a cell density was 465 kcells/m$^2$ (300 cpsi). The honeycomb formed body was placed in a dryer and dried with hot air at 120° C. for 1 hour.

Immediately after the honeycomb formed body was removed from the dryer, the honeycomb formed body was inserted into the balloon chuck having the structure as shown in FIG. 2 such that the flow path direction of the cells was the vertical direction, until the first end face of the honeycomb formed body was brought into contact with a mesh-shaped bottom plate. The honeycomb formed body was then fixed to the balloon chuck by expanding the balloon. The communication port of the balloon chuck was communicated with the exhauster via the pipe. The exhauster was actuated to provide a suction force to the first end face of the honeycomb formed body fixed to the balloon chuck via the communication port, and to suck the ambient air (about 25° C.) at 0.7 m$^3$/min from the second end face of the honeycomb formed body, thereby cooling the honeycomb formed body. In this case, cold air (about 23° C.) was additionally fed at a flow rate of 0.7 m³/min from the blower toward the second end face of the honeycomb formed body. A blowing port for the cold air from the blower was disposed so as to face the second end face of the honeycomb formed body, and a distance between both was 12 cm. In addition, a flow rate of the air sucked from the second end face of the honeycomb formed body was substantially the same as a flow rate of the air sucked by the exhauster.

During the cooling test of the honeycomb formed body, a temperature change of the honeycomb formed body was monitored using a thermocouple at the measurement position b (the center of the air outlet) as shown in FIG. 6, indicating that it only required about 40 seconds.

DESCRIPTION OF REFERENCE NUMERALS

100 honeycomb formed body
102 side face
104 first end face
106 second end face
108 cell
108a first cell
108b second cell
112 partition wall
200 balloon chuck
210 insertion port
220 communication port
230 hollow portion
240 balloon
250 bottom plate
260 through holes
270 side wall
280 fluid port
290 flow path of a fluid
300A, 300B, 300C cooling facility
310 exhaust duct
320 exhauster
330 on-off valve
340 housing
350 blower
360 blower duct
370 coolant blowing port
380 cooler
400 robot arm
410 gripping claw

The invention claimed is:

1. A method for producing a honeycomb structure, the method comprising:
   a step of drying a pillar-shaped honeycomb formed body comprising partition walls that define a plurality of cells each forming a flow path penetrating from a first end face to a second end face; and
   after the step of drying, a step of cooling the honeycomb formed body by applying a suction force to the first end face of the honeycomb formed body to allow a coolant to flow in the honeycomb formed body from the second end face, pass through the cells, and flow out from the first end face.

2. The method for producing the honeycomb structure according to claim 1, wherein in the step of cooling, a relationship: $0.9 \times F_1 \leq F_2 \leq 1.0 \times F_1$ is satisfied, in which $F_1$ is a flow rate of the coolant sucked by a suction device, and $F_2$ is a flow rate of the coolant that flows out from the first end face of the honeycomb formed body to which the suction force is applied by the suction device.

3. The method for producing the honeycomb structure according to claim 1, wherein the step of cooling comprises:
   inserting the honeycomb formed body into a hollow portion of a balloon chuck from the first end face side through an insertion port of the balloon chuck, the balloon chuck comprising the insertion port; a communication port to the suction device; the hollow portion between the insertion port and the communication port; and a balloon disposed around the hollow portion;
   injecting a fluid into the balloon to expand the balloon and fix the honeycomb formed body to the balloon chuck; and
   actuating the suction device to provide the suction force to the first end face of the honeycomb formed body fixed to the balloon chuck, via the communication port.

4. The method for producing the honeycomb structure according to claim 1, wherein the step of cooling further comprises feeding the coolant from a blower toward the second end face of the honeycomb formed body.

5. The method for producing the honeycomb structure according to claim 1, wherein the step of cooling comprises cooling the honeycomb formed body having 100° C. or more to 40° C. or less.

6. The method for producing the honeycomb structure according to claim 5, wherein in the step of cooling, a cooling time from 100° C. to 40° C. is within 120 seconds.

7. The method for producing the honeycomb structure according to claim 1, wherein the step of cooling is carried out while disposing the honeycomb formed body such that a flow path direction of the cells is a vertical direction.

8. The method for producing the honeycomb structure according to claim 1, further comprising a step of plugging an opening of at least one cell on the first end face side and/or the second end face side of the honeycomb formed body, after the step of cooling.

9. The method for producing the honeycomb structure according to claim 1, further comprising a step of cutting the honeycomb formed body in a direction orthogonal to a flow path direction of the cells, after the step of cooling.

10. The method for producing the honeycomb structure according to claim 1, wherein the method comprises carrying out, after the step of cooling, a step of cutting the honeycomb formed body in a direction orthogonal to a flow path direction of the cells, and a step of plugging an opening of at least one cell on the first end face side and/or the second end face side of the honeycomb formed body, in this order.

\* \* \* \* \*